United States Patent [19]

Pelonis

[11] Patent Number: 4,713,721

[45] Date of Patent: Dec. 15, 1987

[54] LIGHTING FIXTURE OVERLOAD PROTECTOR

[75] Inventor: Kosta Pelonis, Bradford, Canada

[73] Assignee: Doric Electronic Laboratories Ltd., Bradford, Canada

[21] Appl. No.: 706,467

[22] Filed: Feb. 27, 1985

[30] Foreign Application Priority Data

Mar. 2, 1984 [CA] Canada .................................. 448762

[51] Int. Cl.[4] ............................................... H02H 3/08

[52] U.S. Cl. ...................................... 361/100; 361/57; 323/245; 323/325; 323/327; 315/307; 315/309

[58] Field of Search ........................ 307/252 B, 252 T; 315/307, 309, 276, 279, 287; 323/245, 325, 327, 905; 361/103, 106, 100, 57

[56] References Cited

U.S. PATENT DOCUMENTS 3,697,863 10/1972 Kilner ................................ 361/106

3,846,674 11/1974 McNulty ............................ 361/106

*Primary Examiner*—M. H. Paschall

*Assistant Examiner*—H. L. Williams

[57] ABSTRACT

A two-terminal A.C. device is described which can be series connected with a lighting fixture to prevent overheating of the fixture in an overload condition, namely, when a lighting element exceeding the power rating of the fixture is installed. In broad terms, the device includes a bidirectional, self-extinguishing switch which can be triggered to conduct current between the two terminals of the device, and control circuitry operable from the voltage difference and current between the two terminals occurring in use to regulate the triggering of the switch. The control circuitry includes triggering circuitry which generates triggering signals from the voltage difference across the terminals of the device and normally applies the triggering signals to the control terminal to permit a predetermined measure of conduction. In an overload condition detection circuitry detects an overload current and activates trigger signal suppressing circuitry which temporarily suppresses the application of triggering signals to the switch thereby reducing the mean level of the current delivered to the fixture in an overload condition. In an overload condition, the lighting fixture is operated in a dim or intermittent fashion thereby indicating the overload condition to the user.

3 Claims, 4 Drawing Figures

LIGHTING FIXTURE OVERLOAD PROTECTOR

FIELD OF THE INVENTION

The invention relates generally to the regulation of power consumption by a lighting fixture or the like.

BACKGROUND OF THE INVENTION

The invention has particular though not exclusive application to recessed lighting fixtures which are commonly mounted in ceilings. Heat tends to build up in the interior of such a fixture, and manufacturers commonly specify with a prominent tag or label the maximum lamp wattage which is recommended for the fixture. Unfortunately, users will often overload a lighting fixture despite the manufacturer's warning, particularly when a lamp of lower, recommended wattage is not available. Such an overload condition can create serious risks of socket burn out and fire.

A commonly adopted protection technique in the case of recessed lighting fixtures is to provide a thermal cut-off in the form of a bi-metalic strip. The bimetalic strip is fixed in thermal communication to the housing of the fixture and serves to discontinue application of line power to the fixture when overheating of the fixture is detected. Such a thermal cut-off is not entirely satisfactory as temperature gradients tend to form over the fixture which may depend in large measure on the surrounding materials. In some applications, the exact location of the bimetalic strip may become critical. Additionally, for many lighting fixtures the use of a bimetalic strip is not convenient, and to the inventor's knowledge there does not appear to be a device available for conveniently handling the problem of fixture overloading.

BRIEF SUMMARY OF THE INVENTION

The invention provides a two-terminal A.C. device which can be series connected with a lighting fixture operable from a line source of predetermined A.C. voltage to prevent overheating of the fixture in an overload condition. The device includes bidirectional self-extinguishing switching means for conducting a current between the two terminals of the device. The switching means have a control terminal at which a triggering signal can be received to initiate conduction. Control means are provided which operate from the voltage difference and current which occurs between the two terminals in use to regulate triggering of the switching means. The control means include triggering means which generate triggering signals from the voltage difference between the two terminals and which normally apply the triggering signals to the control terminals to permit a predetermined measure of conduction. For example, in the preferred embodiments the switching means is a triac which is normally triggered momentarily after the commencement of each half-cycle of the line voltage. The control means also include detection means which detect the magnitude of the current between the two device terminals and which cause trigger signal suppressing means to temporarily suppress application of the triggering signals to the control terminal of the switching means when the detected magnitude of the current exceeds a predetermined level. Because the lighting fixture is normally designed to operate from a predetermined line voltage (commonly 110–120 volts A.C.), the current delivered to the fixture is indicative of its power consumption, and consequently the predetermined level would normally be set to correspond to the manufacturers suggested power rating of the fixture. Thus, the mean value of the current otherwise delivered to the fixture in the overload condition is reduced.

The temporary suppression of triggering signals is preferably a delay of triggering in each half-cycle of the A.C. line voltage whereby the lighting element is seen to glow only dimly, thereby indicating an overload condition. Alternatively, where for example a heat-sensitive current detecting device is employed, the triggering signals may be suppressed for an indeterminate period of time while the element cools. In such circumstances, a periodic or intermittent operation of the lighting element may be expected, also providing an indication of an overload condition, rather than burn out of the lighting element. In any event, the device will limit power consumption in an overload condition and restore itself for normal operation when a lighting element of proper wattage is provided.

BRIEF DESCRIPTION OF THE DRAWINGS

Various objects and advantages of the invention will be better understood with reference to drawings in which.

Figure 1:
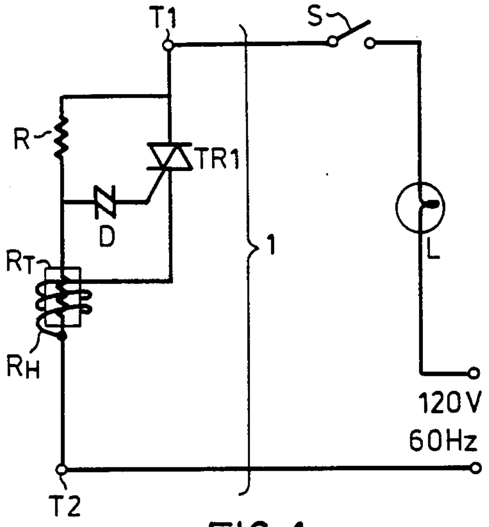
FIG. 1 is a schematic diagram illustrating a first embodiment of the invention.
Figure 2:
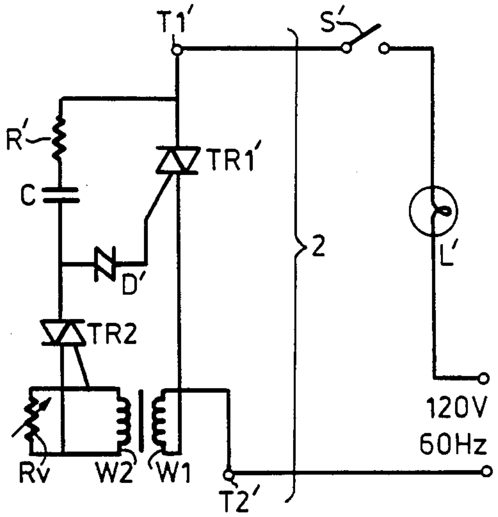
FIG. 2 is a schematic diagram illustrating a second embodiment of the invention.
Figure 3:
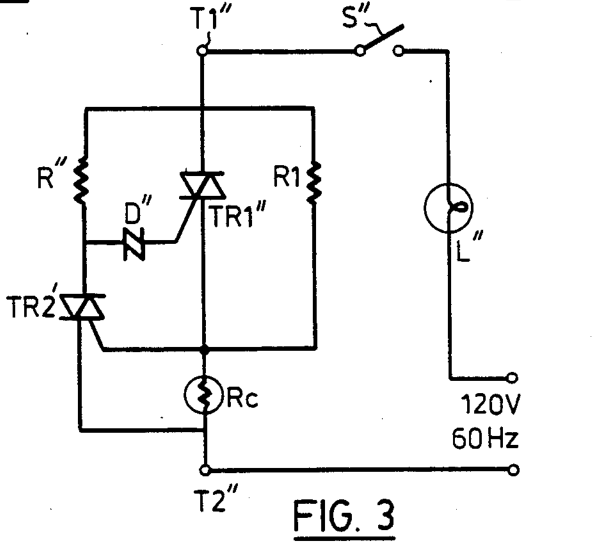
FIG. 3 is a schematic diagram illustrating a third embodiment of the invention; and, FIG. 4 is a graph exemplifying the phase relationship between two switching elements of the embodiment of FIG. 2.

In the schematic views of FIGS. 1–3 components performing an identical function in each of the three embodiments have been indicated with primed reference characters in FIG. 2 and double-primed reference characters in FIG. 3 unless otherwise indicated.

DESCRIPTION OF PREFERRED EMBODIMENTS

FIG. 1 schematically illustrates a first device 1 embodying the invention having a pair of terminals T1, T2 which are shown series connected with a lighting fixture L and a conventional on-off switch S for operation from a 120 volt-60 Hz line supply. The components of the device 1 may normally be mounted in any suitable housing with the terminals T1, T2 exposed for connection to the wiring of the lighting system incorporating the fixture L. In such circumstances, the terminals T1, T2 may comprise conventional screw-down connectors. Alternatively, the device 1 may be incorporated in or may incorporate the switch S. As a further alternative, the device 1 may be incorporated into a socket-type adaptor which can receive a pronged plug commonly provided on lamps and which itself has prongs insertable into a conventional wall power outlet. In such circumstances, the terminals T1, T2 would be connected between a prong of the adaptor which receives power from the wall outlet and a socket portion of the adaptor intended to receive a prong of the lamp plug. Such considerations apply equally to each of the devices described herein and are matters which will be readily apparent to one skilled in the art once the preferred embodiments have been described.

The device 1 includes a bidirectional self-extinguishing switch, namely, a triac TR1 which serves to conduct current between the terminals T1, T2. Conduction in the triac TR1 self-extinguishes with each reversal of the polarity of the voltage difference between the terminals T1, T2, namely, at each half-cycle of the line voltage. The triac TR1 must consequently be re-triggered in each half-cycle of operation to ensure proper application of power to the lighting fixture L. To that end, a conductive loop consisting of a resistor R and a diac D is provided which connects the gate of the triac TR1 to the device terminal T1. In each half-cycle of operation the conductive loop effectively generates from the voltage difference across the terminals T1, T2 a triggering signal which is applied to the gate of the triac TR1. The diac D which is series connected with the gate of the triac TR1 simply provides a voltage threshhold which must be exceeded before a triggering current is received by the triac TR1 and that threshhold voltage will normally be selected sufficiently low that the triac TR1 is conductive throughout almost the entirety of each half-cycle of operation. The threshold voltage provided by the diac D serves a function which is described more fully below in connection with the suppression of triggering signals in an overload condition.

A manganin resistor $R_H$ series connects the triac TR1 to the device terminal T2. The manganin resistor is characterized by a substantially temperature-independent resistance value, and serves in this application as a heating element whose power output is directly proportional to the magnitude of the current conducted by the triac TR1. The manganin resistor is constructed in the form of a heating wire which is wound in thermal communication about a thermistor $R_T$ which has a negative resistance-temperature coefficient, that is, has a resistance value which drops as the temperature of the device rises.

The thermistor $R_T$ connects the conductive loop at the junction of the resistor R and diac D to the device terminal T2. In normal operation, the resistance of the thermistor $R_T$ is sufficiently greater than that of the resistor R that the triggering function provided by the conductive loop is not impaired. However, in an overload condition, the resisted value of the thermistor $R_T$ drops in response to the heating effect of the resistor $R_H$ to an extent that the conductive loop is shorted at the junction of the resistor R and diac D to the device terminal T2 thereby preventing triggering. The resistance characteristics of the thermistor $R_T$ are selected to ensure that a pronounced drop in the resistive value occurs when the current of a predetermined level is conducted by the heating resistor $R_C$. This current level will normally be selected to correspond to the maximum power dissipation rating for the fixture L.

The function of the diac D is to ensure suppression of the triggering signals in the overload condition. The thermistor $R_T$ has a finite impedance in the overload condition, albeit significantly lower than that of the resistor R and is not a true short. The resultant voltage divider effect produced by the series combination of resistor R and thermistor $R_T$ may result in a voltage being developed at the gate of the traic TR1 (absent the diac D) sufficient to deliver a current spike required to initiate conduction. The diac D effectively provides a voltage threshold which must be exceeded before triggering can occur.

Thus, in an overload condition, the thermistor $R_T$ will effectively short the conductive loop to the second device terminal T1 thereby preventing further conduction by the triac TR1. Since the heating resistor $R_H$ no longer receives line current, the thermistor $R_T$ will no longer be heated and its resistance value will gradually rise. When the resistive value has increased sufficiently due to cooling, the conductive loop will once again trigger the triac TR1 for conduction. As a result, the lighting fixture L will be intermittently operative, indicating the existing overload condition. Once the lighting element in the fixture L has been replaced with one of proper wattage, normal operation can be resumed.

FIG. 2 illustrates a device 2 which is an alternative embodiment of the invention. The device 2 differs from the device 1 essentially in the manner in which current detection and trigger signal suppression are effected, all of which will be described in greater detail below. Components of the device 2 which are essentially identical of those of the device 1 are labelled with the same but primed reference character and will not be described in detail in order to highlight the differences between the devices 1 and 2.

In the device 2, the trigger signal suppressing means include a triac TR2 which replaces the thermistor $R_T$ of the device 1. The triac TR2 when actuated effectively shorts the conductive loop consisting of the resistor R', capacitor C and diac D' to the device terminal T2'. A particular advantage of the triac TR2 is more predictable shorting of the conductor loop to divert a triggering signal.

In the device 2, the means for detecting the current flowing between the terminals T1', T2' is a transformer. The transformer has a primary winding W1 which series connects the triac TR1' to the device terminal T2' thereby conducting the load current. The secondary winding W2 of the transformer is connected to the gate of the triac TR2. The transformer is preferrably formed as an iron rod on which a few turns of wire are wound to form the primary and secondary windings W1, W2. The windings ratio is so selected that when a predetermined load current is conducted by the triac TR1', the voltage developed across the secondary winding W2 is sufficiently large to produce the triggering current pulse required to initiate conduction in the triac TR2. A variable resistor $R_V$ which shunts the secondary winding W2 and which has a resistance value generally in the order of the secondary winding W2 effectively permits selection of the current level between the terminals T1', T2' which will trigger conduction in the triac TR2.

Figure 4:
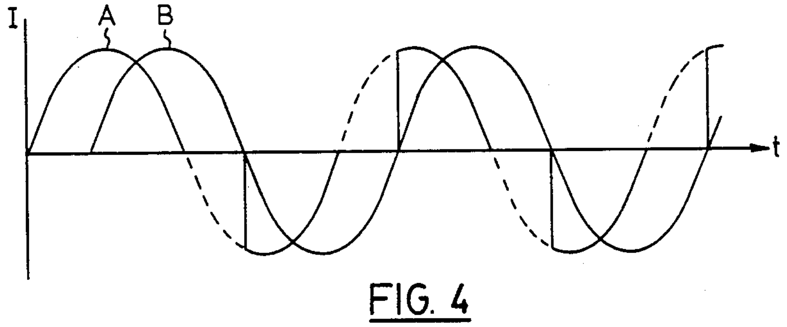

The conductive loop of the device 2 used normally to trigger the triac TR1' includes a capacitor C, a phase-shifting impedance. The purpose of the capacitor C is to phase-delay conduction of the triac TR2 relative to the triac TR1 during an overload condition. The purpose of the phase shifting will be readily apparent from FIG. 4 in which startup of the device 2 in an overload condition is illustrated. The curve A represents current conducted by the triac TR1' (load current), and the current B, the current conducted by the triac TR2. No attempt has been made to indicate the relative scaling of the currents conducted by the triacs TR1', TR2'. Because of the phase delay, triac TR2 will still be conducting current in each cycle after the current in the triac TR1' has reached a 0 cross-over. Thus, the triac TR2 is conditioned to delay triggering of the triac TR1' in each half-cycle of the line voltage. This suppression of triggering in the triac TR1' will be apparent by comparing the solid sections of curve A (actual conduction in overload condition) with the stippled parts that indicate in a general way the conduction which would otherwise occur. It should be noted that no attempt has been made in view of FIG. 4 to indicate the effect of the diac D' which would also appear to delay triggering of the triac TR1' relative to zero cross-over in each half-cycle of the line voltage, although to a comparatively small degree.

In normal operation, the conductive loop triggers TR1 in each half-cycle if the line voltage (substantially at a zero cross-over in the line voltage) thereby permitting substantially unfettered delivery of power to the fixture L'. In an overload condition, the load current is effectively detected in the transformer primary winding W1, and causes the secondary winding W2 to generate a voltage sufficient to produce the triggering current pulse required to fire the triac TR2. Once triggered, the triac TR2 shorts the conductive loop which normally initiates conduction in the triac TR1' for an interval in each half-cycle of the line voltage, thereby effectively phase-delaying conduction in the triac TR1' in each half-cycle. As a result, the mean value of the voltage applied to the lighting fixture L' (or alternatively viewed, the mean current delivered to the lighting fixture L') is significantly reduced. Thus, where an incandescent lighting element of excessive wattage in inserted into the lighting fixture L', the element is illuminating at a fraction of its normal level, indicating the overload condition.

FIG. 3 illustrates a device 3 which is a third embodiment of the invention. Components of the device 3 which are identical to those of the device 1 are indicated with the same reference character, double-primed. A triac TR2' serves substantially the same function as the triac TR2 of the device 2 in suppressing triggering signals in an overload condition.

Detection of the load current is effected by a temperature-sensitive barium titinate resistor $R_C$. The resisitor $R_C$ series connects the triac TR1" to the second device terminal T2" thereby conducting the load current. The resistor $R_C$ is also connected to the gate of the triac TR2 so that the voltage difference developed across the resistor $R_C$ is applied to the gate of the triac TR2'. The gate of the triac TR2' is also connected by a second conductive loop containing a resistance R1 to the device terminal T1". The second conductive loop is capable, depending on the impedance of the resistor $R_C$ at any given time, of triggering the triac TR2' thereby depriving the triac TR1" of a triggering signal.

The resistance characteristics of the resistor $R_C$ are as follows. The resistance has a relatively low, relatively constant value below a predetermined temperature which is commonly referred to as the Curie temperature. Above the Curie temperature, the resistor $R_C$ displays a very pronounced positive resistance-temperature coefficient, that is, the resistance increases in a relatively large fashion with increasing temperature. The characteristics of the resistor $R_C$ will be so selected that at a predetermined current level corresponding substantially to the maximum power rating of the fixture L" the resistor $R_C$ reaches substantially the Curie temperature. Thus any further increase in the load current causes a very dramatic increase in the resistance of the resistor $R_C$. In the overload condition, the resistance of the resistor $R_C$ must be considerably larger than that of the resistor $R_1$ so that triggering of the triac TR2' through the second conductive loop is enabled.

In normal operation, the triac TR1" of the device 3 is triggered by the conductive loop consisting of the resistor R" and triac D" to permit conduction of load current throughout substantially the entirety of the half-cycle of the line voltage. In the overload condition, the overload current causes the resistance of the resistor $R_C$ to increase markedly thereby enabling triggering of the triac TR2' through the second conductive loop containing the resistor R1. Because of the presence of the diac D", in the overload condition, conduction of the triac TR2' preceeds in each half-cycle conduction by the triac TR" thereby inhibiting delivery of load current to the fixture L". This suppression of the triggering signal required by the triac TR1" continues until the resistor $R_C$ has cooled sufficiently. Thus, in the overload condition, the lighting element of the light fixture R" will be periodically or intermittently operated, thereby indicating the overload condition.

Three embodiments of the invention have been illustrated. The device D1 is preferred for the low cost of construction. The device 2 is strongly preferred where a very precise detection and limiting of an overload condition is required. In particular, the device 2 is capable of reacting to an overload condition within 1 cycle of the line voltage. Additionally, in the overload condition, the device 2 will deliver a substantially reduced load current to add incandescent lighting element thereby causing the overload condition to be indicated by the relatively dim state of the lighting element.

It will be appreciated that particular embodiments of the invention have been described and that modifications may be made therein without departing from the spirit of the invention and the scope of the appended claims.

I claim:

1. A two-terminal AC device which can be series connected with a lighting fixture having a predetermined power rating and operable from a line source of predetermined AC voltage to prevent overheating of the fixture in an overload condition, comprising:

first bidirectional self-extinguishing switching means for conducting current between the two device terminals, the switching means having a control terminal at which a triggering signal can be applied to trigger conduction by the first switching means;

a conductive path so coupling the control terminal of the first bidirectional switching means to one of the device terminals that triggering signals are applied to the control terminal of the first switching means in response to voltage differences generated between the two device terminals;

a second bidirectional self-extinguishing switching means for so coupling the conductive path to the other of the two device terminals, when the second switching means is conductive, that conduction of the first switching means is suppressed, the second switching means having a control terminal at which a signal can be applied to trigger conduction of the second switching means;

a transformer having a primary winding and a secondary winding, the primary winding being coupled to the first switching means such that the current between the two device terminals flows through the primary winding, the secondary winding being coupled to an impedance such that the secondary current generates a voltage signal and being coupled to the control terminal of the second switching means such that the voltage signal is applied to the control terminal of the second switching means, the transformer ratio and the impedance coupled to the secondary winding being so selected that the generated voltage signal triggers conduction by the second switching means when the current conducted between the two device terminals exceeds a predetermined level;

the conductive path having a phase-shifting impedance which delays current conduction in the second switching means relative to current conduction in the first switching means such that, when the current between the two-device terminals exceeds the predetermined level, triggering of the second switching means delays conduction by the first switching means thereby reducing the mean value of the current delivered to the fixture.

2. A device as claimed in claim 1 in which each of the first and second switching means is a triac.

3. A device as claimed in claim 2 in which the conductive path comprises a resistive impedance and a capacitor.

* * * * *